United States Patent [19]

Maruyama

[11] Patent Number: 5,060,129
[45] Date of Patent: Oct. 22, 1991

[54] METHOD OF CONTROLLING THREE-PHASE, THREE-LEVEL INVERTER

[75] Inventor: Takafumi Maruyama, Amagasaki, Japan

[73] Assignee: Mitsubishi Denki Kabushiki Kaisha, Japan

[21] Appl. No.: 638,814

[22] Filed: Jan. 8, 1991

[30] Foreign Application Priority Data

Apr. 11, 1990 [JP] Japan .................................. 2-96707

[51] Int. Cl.$^5$ ......................................... H02M 7/5387
[52] U.S. Cl. ......................................... 363/41; 363/98
[58] Field of Search ........................ 363/41, 42, 80, 96, 363/98

[56] References Cited

U.S. PATENT DOCUMENTS

| | | | |
|---|---|---|---|
| 4,347,558 | 8/1982 | Kalinsky | 363/98 |
| 4,635,177 | 1/1987 | Shekhawat et al. | 363/41 |
| 4,953,069 | 8/1990 | Braun et al. | 363/41 |

OTHER PUBLICATIONS

Nabie et al., "A New Neutral-Point-Clamped PWM Inverter", IAS Annual Mtg 1980, Cincinnati, Ohio, U.S.A., pp. 761-766, (Sep. 28 to Oct. 3, 1980).

*Primary Examiner*—William H. Beha, Jr.
*Attorney, Agent, or Firm*—Leydig, Voit & Mayer

[57] ABSTRACT

A method of controlling a three-phase, three-level inverter comprises the steps of: jugding whether the current of the output terminal of an inverter of the phase such that the electrical potential of the output terminal equals to the neutral-point terminal of the capacitor among three-output terminals of the inverter is in a positive direction in which current flows into a load connected to this output terminal or in a negative direction in which current flows from the load when another on/off mode having the same instantaneous space voltage vector as the instantaneous space voltage vector in a tentatively selected on/off mode exists; actually selecting the tentatively selected on/off mode if the result of the judgment is positive and actually selecting another on/off mode instead of the tentatively selected on/off mode when the result of the judgement is negative in the case where the electrical potential of the neutral-point terminal of the capacitor is above a preset upper-limit value; and actually selecting the tentatively selected on/off mode if the result of the judgment is negative and actually selecting another on/off mode instead of the tentatively selected on/off mode when the result of the judgment is positive in the case where the electrical potential of the neutral-point terminal of the capacitor is below a preset lower-limit value.

4 Claims, 2 Drawing Sheets

METHOD OF CONTROLLING THREE-PHASE, THREE-LEVEL INVERTER

BACKGROUND OF THE INVENTION

1. Field of the Invention

The present invention relates to a method of controlling a three-phase, three-level inverter and, in particular, to a control method of suppressing the variation of a neutral-point electrical potential of a capacitor contained in the inverter.

2. Description of the Related Art

FIG. 2 is a circuit diagram showing the arrangement of a conventional three-phase, three-level inverter presented, for example, in "A Current Control Scheme of Neutral-Point-clamped Voltage Source Inverters for Vector Control Systems", Thesis No. 113, Electrical Society, Industrial Application Department National Conference in 1989. In FIG. 2, the inverter includes a DC voltage source 1, a reactor 2 connected to the positive terminal of the DC voltage source 1, and a capacitor 3, one terminal P thereof being connected to the reactor 2 and the other terminal N thereof being connected to the negative terminal of the DC voltage source 1. The capacitor 3 is made up of a pair of capacitors 3a and 3b of the same rating, and a neutral-point terminal O is lead out from the point at which these capacitors are connected.

The inverter has pairs of transistors 4a–4b, 4c–4d, 5a–5b, 5c–5d, 6a–6b, and 6c–6d, each transistor of each pair being connected in serial. The first transistor pair 4a–4b and the second transistor pair 4c–4d, the third transistor pair 5a–5b and the fourth transistor pair 5c–5d, and the fifth transistor pair 6a–6b and the sixth transistor pair 6c–6d are respectively connected in serial, and these serial circuits are connected in parallel to each other between both of the terminals P and N of the capacitor 3. To each of the transistors 4a–4d, 5a–5d, and 6a–6d, free-wheeling diodes 7a–7d, 8a–8d, and 9a–9d are respectively reversely connected in parallel.

The cathodes of the first, third, and fifth diodes 10a, 11a, and 12a are respectively connected to the intermediate points of the first, third, and fifth transistor pairs. Each anode of these diodes is connected to the neutral-point terminal O of the capacitor 3. The anodes of the second, fourth, and sixth diodes 10b, 11b, 12b are respectively connected to the intermediate points of the second, fourth, and sixth transistor pairs. Each cathode of these diodes is connected to the neutral-point terminal O of the capacitor 3. Further, a U-phase output terminal $T_u$ is lead out from the connection point of the first transistor pair and the second transistor pair. A V-phase output terminal $T_v$ is lead out from the connection point of the third transistor pair and the fourth transistor pair. A W-phase output terminal $T_w$ is lead out from the connection point of the fifth transistor pair and the sixth transistor pair.

Next, the operation of the conventional inverter will be explained. First, the U phase will be taken as an example. The switching state of each of the transistors 4a to 4d of the U phase, i.e., the relationship between the on/off mode and the electrical potential of the output terminal $T_u$, is shown in Table 1.

TABLE 1

| Electrical Potential of Output Terminal $T_u$ | Transistor 4a | Transistor 4b | Transistor 4c | Transistor 4d |
|---|---|---|---|---|
| E | ON | ON | OFF | OFF |
| O | OFF | ON | ON | OFF |
| −E | OFF | OFF | ON | ON |

The output voltage of the DC voltage source 1 is taken to be 2E.

As shown above, the electrical potential of the output terminal $T_u$ has three kinds of values corresponding to the terminals P, N, and O of the capacitor 3, the particular value depending upon the switching state of the transistor. This is the reason why the inverter is called a three-level inverter. The same can be said about the V and W phases as has been said above about the U phase.

Next, the on/off mode of each transistor is in turn switched in order to take out the three phase outputs. It is considered that this on/off mode has a total of $3^3=27$ kinds of modes. However, some of the on/off modes of these transistors have the same instantaneous space voltage vector (hereinafter referred to simply as a voltage vector) which is determined by the above-mentioned three kinds of electrical potentials. For this reason, there are a total 19 kinds of voltage vectors which are separate from each other. Table 2 summarizes the above relationship and shows the relationships among on/off modes M1 to M27, voltage vectors V0 to V18, and the output potentials $V_u$, $V_v$, and $V_w$ of each of the output terminals $T_u$, $T_v$, and $T_w$.

It is necessary that the neutral-point terminal O of the capacitor 3 be primarily at a zero potential. In practice, however, it varies due to a load current $I_u$, etc. supplied to the load from the output terminal $T_u$, and so on. A technique for controlling the selection of the on/off mode in order to suppress the amount of this variation has been previously performed.

TABLE 2

| On/off Mode | Voltage Vector | V u | V v | V w |
|---|---|---|---|---|
| M1 | V0 | E | E | E |
| M2 | | O | O | O |
| M3 | | −E | −E | −E |
| M4 | V1 | E | O | O |
| M5 | | O | −E | −E |
| M6 | V2 | E | −E | −E |
| M7 | V3 | E | O | −E |
| M8 | V4 | O | O | −E |
| M9 | | E | E | O |
| M10 | V5 | E | E | −E |
| M11 | V6 | O | E | −E |
| M12 | V7 | O | E | O |
| M13 | | −E | O | −E |
| M14 | V8 | −E | E | −E |
| M15 | V9 | −E | E | O |
| M16 | V10 | −E | O | O |
| M17 | | O | E | E |
| M18 | V11 | −E | E | E |
| M19 | V12 | −E | O | E |
| M20 | V13 | O | O | E |
| M21 | | −E | −E | O |
| M22 | V14 | −E | −E | E |
| M23 | V15 | O | −E | E |
| M24 | V16 | O | −E | O |
| M25 | | E | O | E |
| M26 | V17 | E | −E | E |
| M27 | V18 | E | −E | O |

That is, as can be understood from Table 2, when a voltage vector V1 is output, M4 and M5, for example, can be selected as an on/off mode. Since the connection relationship among the neutral-point terminal O and the output terminal $T_u$, and so on differ depending upon the on/off state of each transistor in both of the modes, the influence exerted on the electrical potential of the middle point terminal O by the load current $I_u$, and so on will differ in both of the modes. Hence, the mode in which the electrical potential variation amount of the neutral-point terminal O is smaller is selected.

In the conventional three-phase, three-level inverter, the selection of the above-mentioned on/off mode performed in order to suppress the electrical potential variation amount of the neutral-point terminal O has been determined from a load current vector. That is, a load current vector is computed from the load currents $I_u$, $I_v$, and $I_w$ of each phase, and an on/off mode to be selected has been determined from the area of this load current vector.

Accordingly, as a computation process by which a load current vector is determined is required, the apparatus of the conventional invention becomes more complex and expensive.

SUMMARY OF THE INVENTION

The present invention has been devised to solve the above-mentioned problems. An object of the present invention is to provide a method of controlling a three-phase, three-level inverter, which method is capable of easily making the selection of an on/off mode performed to suppress an electrical potential variation of the neutral-point terminal O of a capacitor without using a complex apparatus.

A method of controlling a three-phase, three-level inverter of the present invention comprises the steps of: judging whether the current of the output terminal of an inverter of the phase such that the electrical potential of the output terminal equals to the neutral-point terminal of the capacitor among three-output terminals of the inverter is in a positive direction in which current flows into a load connected to this output terminal or in a negative direction in which current flows from the load when another on/off mode having the same instantaneous space voltage vector as the instantaneous space voltage vector in a tentatively selected on/off mode exists; actually selecting the tentatively selected on/off mode if the result of the judgment is positive and actually selecting another on/off mode instead of the tentatively selected on/off mode when the result of the judgment is negative in the case where the electrical potential of the neutral-point terminal of the capacitor is above a preset upper-limit value; and actually selecting the tentatively selected on/off mode if the result of the judgment is negative and actually selecting another on/off mode instead of the tentatively selected on/off mode when the result of the judgment is positive in the case where the electrical potential of the neutral-point terminal of the capacitor is below a preset lower-limit value.

DESCRIPTION OF THE PREFERRED EMBODIMENTS

Figure 2:
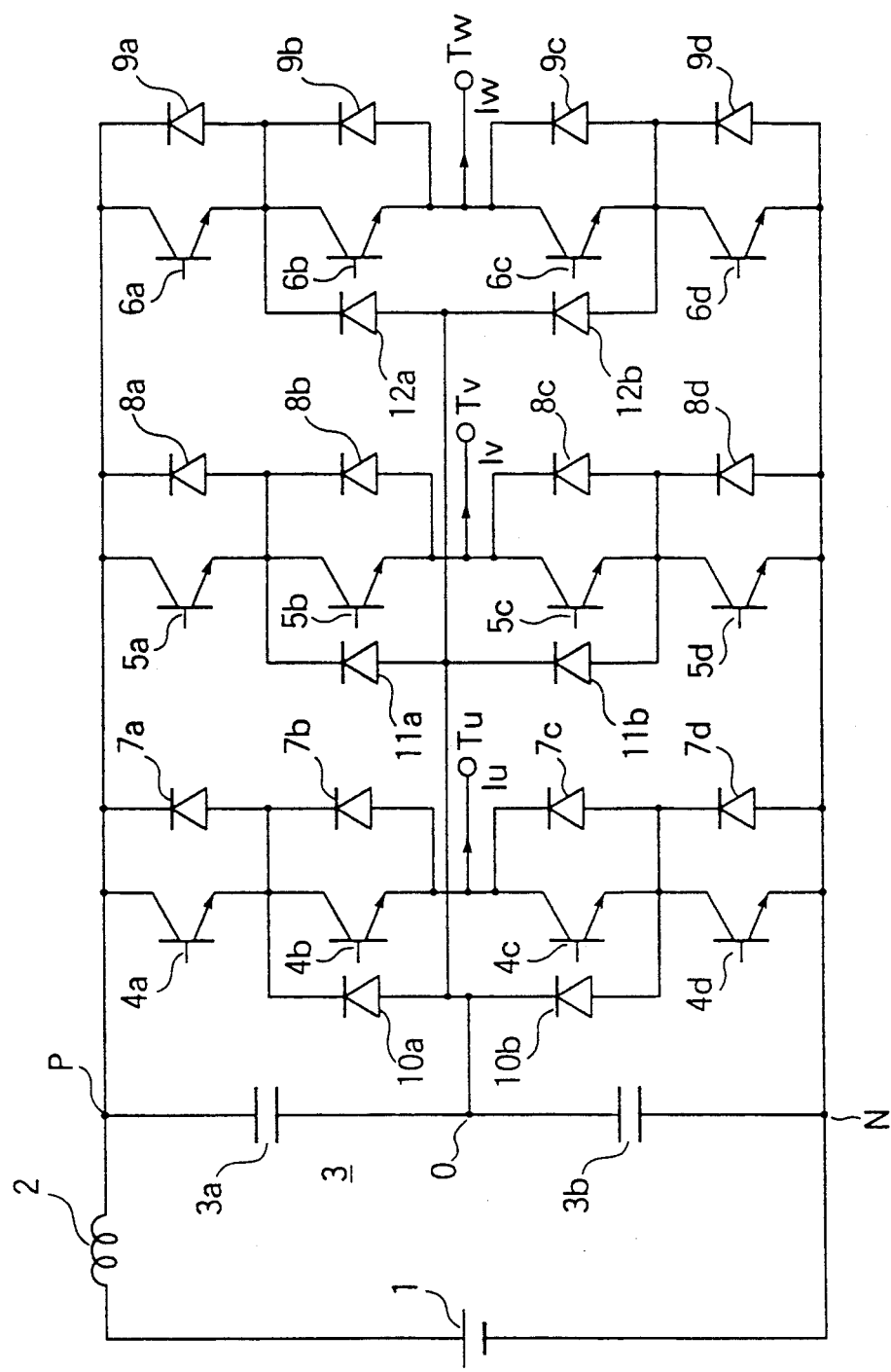
FIG. 2 is a circuit diagram showing the conventional three-phase, three-level inverter.

The main circuit arrangement of an inverter controlled by this embodiment is identical to that of the conventional circuit shown in FIG. 2, thus an explanation thereof is omitted.

Figure 1:
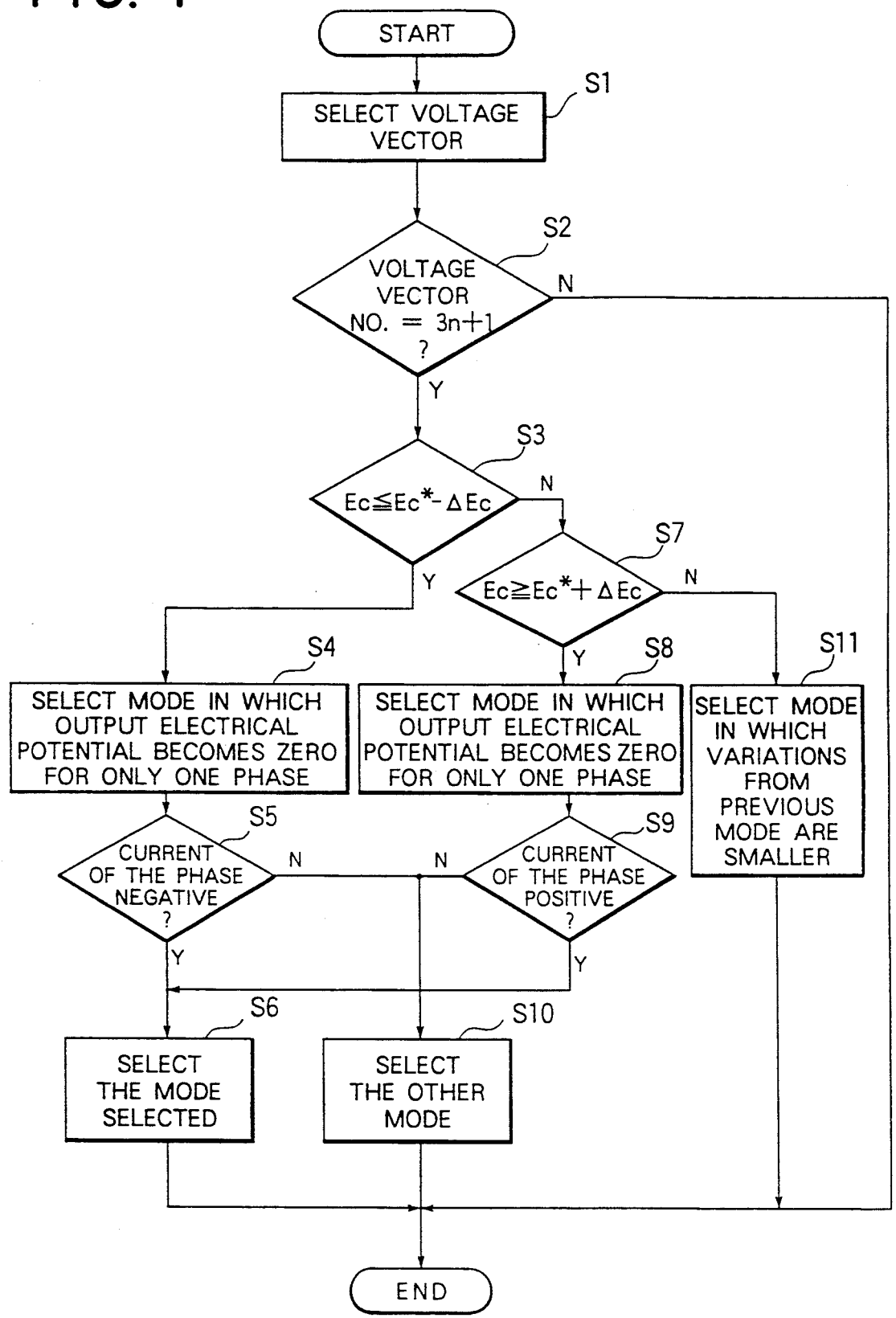
FIG. 1 is a flowchart showing a control method according to the first embodiment of the present invention.

FIG. 1 is a flowchart showing a series of operations from "Start" to "End" which are performed in a fixed sampling cycle. In FIG. 1, S1 is a step in which a voltage vector required to obtain a desired three-phase AC output is selected, which corresponds to the primary function of the inverter. To be specific, one of the voltage vectors V0 to V18 listed in Table 2 is selected, and a control signal is sent out to each transistor in accordance with the on/off modes M1 to M27 for generating the selected voltage vector.

S2 is a step in which whether or not the voltage vector No. selected in step S1 is 3n+1 (where n=0 to 5) is determined. That is, as is understood from Table 2, it is determined whether or not a pair of on/off modes of two kinds exist for the same voltage vector, for example, as for V1. If the voltage vector No. does not correspond to one of these numbers, there is no room for selection, and the process is terminated without further action.

If the voltage vector No. corresponds to one of these numbers, the process proceeds to step S3, where whether or not the electrical potential $E_c$ of the neutral-point terminal O of the capacitor 3 falls below a predetermined lower-limit value ($E_c^* - \Delta E_c$) is determined. $E_c^*$ indicates the electrical potential instruction value of the neutral-point terminal O, and $\Delta E_c$ indicates an allowable voltage width.

If it is determined in step S3 that $E_c$ is below a predetermined lower-limit value, it is judged that a charging request is made, and the process proceeds to step S4 where the capacitor 3 is brought into a charged state so that its electrical potential rises. That is, of the two kinds of on/off modes which exist for the same voltage vector, a mode in which an output electrical potential becomes zero for only one phase is tentatively selected. For example, if the case where a voltage vector is V10 is assumed, an on/off mode M17 corresponds to the one to be selected. Thus, the on/off mode M17 is tentatively selected. In the subsequent step S5, whether or not the current of the phase in which the output electrical potential is zero is negative, i.e., the current $I_u$ of the U phase is negative in the tentatively selected mode M17, is determined. At this point, the direction in which a current flows out to a load is taken to be positive. Therefore, in step S5, whether or not a current is in the direction in which it flows into the capacitor 3, i.e., whether the above-mentioned charging request is satisfied, is determined. If the result of the judgment is negative, it is judged that the charging request is satisfied, and the corresponding mode is actually selected without further action in step S6, then the process is terminated.

Returning now to step S3, if it is judged that the electrical potential $E_c$ of the neutral-point terminal O is not below the lower-limit value, it is determined in step S7 whether or not this electrical potential $E_c$ is above a predetermined upper-limit value ($E_c^* + \Delta E_c$)

If it is determined that $E_c$ is above the upper-limit value, it is judged that the capacitor 3 is in the discharge request state. After the same mode selection is made in step S8 as in step S4, it is determined in step S9 whether or not the discharge request is satisfied at this time, i.e., whether or not the current of the corresponding phase flows out from the capacitor 3 in the positive direction. If it is the positive direction, the process proceeds to step S6, where the mode which has been tentatively selected is actually selected, and the process is terminated.

When it is judged in step S5 that it is not negative, or when it is judged in step S9 that it is not positive, the process proceeds to step S10, where the other mode from among the two kinds of on/off modes is actually selected.

At this point, the reason why the charge or discharge request is satisfied by the process of step S10 will be explained. As can be understood from Table 2, in the other mode, the output electrical potential of the other two phases except the phases which were taken notice of in step S4 or S8 becomes zero. That is, the output terminals of the above two phases are directly connected to the neutral-point terminal O of the capacitor 3.

If the currents of each phase to a load are denoted as $I_u$, $I_v$, and $I_w$, then the following relation holds:

$$I_u + I_v + I_w = 0.$$

Therefore, when an explanation is made following the case of the voltage vector V10 described above, if the phase current $I_u$ of the on/off mode M17 tentatively selected in step S4 is judged to be "not", i.e., positive, from the following equation derived from the above relation: $I_v + I_w = -I_u$, the current $(I_v + I_w)$ of the capacitor 3 is negative in the other on/off mode M16. Therefore, the current will flow into the capacitor 3, and the charging request is satisfied.

Returning now to step S7, when it is judged that the electrical potential $E_c$ is not above the upper-limit value, the electrical potential $E_c$ of the neutral-point terminal O is seen to exist in the allowable range, after all. Any mode may be selected from the viewpoint of voltage variation. Therefore, in step S11, the on/off mode in which variation of on/off states of switching elements, such as transistors, from the previous on/off mode is smaller is actually selected.

As has been explained above, in this embodiment, a proper selection of an on/off mode is made possible by a simple process of judging whether a current is positive or negative without performing a complex current vector computation. Hence, the apparatus of the present invention becomes simple, and operates more reliably and stably.

In the above-described embodiment, the upper-limit value and the lower-limit value of the variation width of the neutral-point terminal O are set in such a way that an allowable voltage width $\Delta E_c$ is added to or subtracted from the electrical potential instruction value $E_c^*$. These limit values may be set freely as required.

What is claimed is:

1. A method of controlling a three-phase, three-level inverter, in which a plurality of on/off modes are in turn switched in order to control an instantaneous space voltage vector determined by a combination of the electrical potentials of both terminals and the neutral-point terminal of the capacitor of said three-phase, three-level inverter comprising a DC voltage source, a capacitor both terminals of which connected to said DC voltage source and having a neutral-point terminal positioned between both of these terminals, and a plurality of switch elements connected to the section between both terminals and the neutral-point terminal of said capacitor and three output terminals of the inverter, comprising the steps of:

judging whether the current of the output terminal of an inverter of the phase such that the electrical potential of the output terminal equals to that of the neutral-point terminal of said capacitor among three-output terminals of said inverter is in a positive direction in which current flows into a load connected to this output terminal or in a negative direction in which current flows from the load when another on/off mode having the same instantaneous space voltage vector as the instantaneous space voltage vector in a tentatively selected on/off mode exists;

actually selecting the tentatively selected on/off mode if the result of said judgment is positive and actually selecting another on/off mode instead of the tentatively selected on/off mode when the result of said judgment is negative in the case where the electrical potential of the neutral-point terminal of said capacitor is above a preset upper-limit value; and actually selecting the tentatively selected on/off mode if the result of said judgment is negative and actually selecting another on/off mode instead of the tentatively selected on/off mode when the result of said judgment is positive in the case where the electrical potential of the neutral-point terminal of said capacitor is below a preset lower-limit value.

2. A control method as claimed in claim 1, further comprising the step of selecting the mode in which the variation of on/off states of switching elements from the on/off mode previously selected is smaller when the electrical potential of the neutral-point terminal of said capacitor is between the upper-limit value and the lower-limit value which have been preset.

3. A control method as claimed in claim 1, wherein said upper-limit value is a value that an allowable voltage width is added to the electrical potential instruction value of the neutral-point terminal of said capacitor.

4. A control method as claimed in claim 1, wherein said lower-limit value is a value that an allowable voltage width is subtracted from the electrical potential instruction value of the neutral-point terminal of said capacitor.

* * * * *